United States Patent [19]

Mita et al.

[11] 4,421,954
[45] Dec. 20, 1983

[54] AUTOMATIC TELEPHONE ANSWERING AND MESSAGE RECORDING DEVICE

[75] Inventors: Satoshi Mita; Kouichi Tanaka, both of Kanagawa; Yoshitomo Nakano, Tokyo; Harumi Saita, Kanagawa; Akira Nakayama, Tokyo, all of Japan

[73] Assignee: Sony Corporation, Tokyo, Japan

[21] Appl. No.: 261,512

[22] Filed: May 7, 1981

[30] Foreign Application Priority Data

May 12, 1980 [JP] Japan .................................. 55-62509

[51] Int. Cl.$^3$ ........................................... H04M 1/64
[52] U.S. Cl. .................................. 179/6.13; 360/72.2; 360/74.4; 369/50
[58] Field of Search ............ 179/6.03, 6.07, 6.11–6.17; 369/50; 360/72.1–72.2, 74.4, 66

[56] References Cited

U.S. PATENT DOCUMENTS

| Re. 30,416 | 10/1980 | Yasunaga | 360/74.4 |
|---|---|---|---|
| 3,171,902 | 3/1965 | Jones et al. | 369/50 |
| 4,032,712 | 6/1977 | Catto et al. | 179/6.14 |
| 4,309,571 | 1/1982 | Chamberlin | 179/6.14 |

Primary Examiner—Raymond F. Cardillo, Jr.
Attorney, Agent, or Firm—Lewis H. Eslinger; Alvin Sinderbrand

[57] ABSTRACT

An automatic telephone answering device employs a single magnetic tape and a single driving mechanism for driving the magnetic tape. Whenever an incoming call is received, a control circuit of the device sets the driving mechanism into a playback mode to play to the calling party an outgoing message recorded at the beginning of a track on the single magnetic tape. Then, if there have been no previously recorded incoming messages, the device records the calling party's incoming message on the same track after detecting the end of the recorded outgoing message. However, if any incoming messages have been recorded previously on the same track of the single magnetic tape, the tape is advanced at high speed to a point beyond the last of these previously recorded incoming messages. Then, the present incoming message is recorded. As soon as the incoming call is terminated and the recording of the incoming message is ended, the device is set into a rewind mode. When the beginning of the recorded outgoing message is detected, the driving mechanism is stopped, and the device is set into a standby mode to greet the next incoming call with the recorded outgoing message. In a preferred embodiment, a microcomputer is used to control the operation of the device. Also, in a preferred embodiment, a low-frequency (30 Hz) control signal is recorded with the outgoing message and with the incoming messages, and the recorded messages are separated by silent regions free of any recorded control signal.

8 Claims, 9 Drawing Figures

AUTOMATIC TELEPHONE ANSWERING AND MESSAGE RECORDING DEVICE

BACKGROUND OF THE INVENTION

1. Field of the Invention

This invention relates generally to magnetic recording and reproducing apparatus for automatic telephone answering devices with which a calling party is greeted by a recorded outgoing message, and any incoming message which the calling party desires to leave is recorded on a magnetic medium. In particular, this invention is directed to a telephone answering device in which a single magnetic tape and a single driving mechanism therefor are provided, and in which the outgoing message and the incoming messages are recorded in the same track on the magnetic tape.

2. Brief Description of the Prior Art

In many previously proposed telephone answering devices, two separate tapes are required: one for the recorded outgoing message and one for recording the incoming messages. A typical such device is disclosed in U.S. Pat. No. 3,445,600, to Leonard M. Todd. In this previously-proposed device, ringing current causes the device to seize the phone line, and also starts play of an endless tape on which a prerecorded outgoing message is recorded. After the endless tape has completed its cycle, a message recorder is started. This message recorder then records any incoming message on a separate tape. Because such a telephone answering device requires separate driving mechanisms for the two magnetic tapes, and also requires separate transducers and other ancillary equipment, this type of device is rather complicated, and therefore quite expensive. It is also quite difficult to construct such a device in a compact form.

One attempt to improve upon the above-mentioned device has been disclosed, for example, in U.S. Pat. No. 3,943,292, to M. Takazawa. This proposed device utilizes a single magnetic tape for both the outgoing message and the incoming messages, but requires a pair of magnetic heads that are spaced a sufficient distance apart so that when an incoming call is received, the first magnetic head picks up the recorded message on the tape and transmits it to the calling party, while simultaneously, the recorded message picked up by the first head is transmitted to the second magnetic head. Thus, the recorded outgoing message is recorded repeatedly on the tape. The calling party's incoming message is then recorded in the space between the successive recordings of the outgoing message.

While this proposed device does indeed provide economy in that only a single tape and a single associated tape drive are required, because the device records the same outgoing message repeatedly, a great deal (about half) of the available length of the magnetic tape is wasted.

OBJECTS AND SUMMARY OF THE INVENTION

It is an object of this invention to provide an automatic telephone answering device which is free of the above defects of the prior art.

It is another object of this invention to provide an automatic telephone answering device which, by virtue of requiring only a single magnetic tape and only a single drive therefor, is relatively simple and inexpensive.

It is another object of this invention to provide an automatic telephone answering device in which an outgoing message recorded at the beginning of a magnetic tape is reproduced for each incoming call, and in which incoming messages from successive calling parties are recorded, in sequence, on the same track of the magnetic tape.

According to one aspect of this invention, a telephone answering device includes a magnetic tape device having a stop mode, a rewind mode, a forward mode, and a fast-forward mode. This automatic telephone answering device operates by automatically coupling the device to an associated phone line upon detection of a ringing signal on the phone line; setting the device into its forward mode and playing a prerecorded outgoing message recorded in a track on the magnetic tape; after playing of the outgoing message, and if no previous incoming messages have been recorded, recording in the track any incoming message from the calling party, but, if there have been previously recorded any such incoming messages, setting the device into its fast-forward mode until the tape is driven beyond the last such previously-recorded incoming message, and then setting the device into its forward mode and recording the incoming message from the calling party; after termination of the incoming message, setting the device into its rewind mode; and when the tape has been rewound to a point corresponding to the beginning of the recorded outgoing message, setting the device into its stop mode, thereby conditioning the device to greet any subsequent calling party by playing back the recorded outgoing message.

In a favorable embodiment of this invention, an automatic telephone answering device includes a detector for detecting any incoming calls, and automatically coupling the device to the associated phone transmission line whenever an incoming call is detected; a transducer head for recording and picking up signals on a magnetic medium, such as magnetic tape; a drive mechanism for advancing the magnetic medium relative to the transducer head and which is capable of being set into a forward mode, a fast-forward mode, a rewind mode, and a stop mode; a control signal generator for supplying a control signal, such as a 30 Hz tone, to the transducer head; a control signal detector for detecting the control signal picked up from the magnetic medium by the transducer head; and a control circuit, which can include a microprocessor, coupled to the drive mechanism, the control signal generator, and the control signal detector for controlling the control generator and the drive mechanism. With this device, the control signal is applied onto the magnetic medium to mark at least the beginning and end of the outgoing message and to mark at least the end of each incoming message. The drive means is then controlled so that when the device is first connected to the phone transmission line, the drive mechanism is set into its forward mode to play back the outgoing message. When the control signal detector determines that the control signal picked up by the transducer head has a characteristic indicative of the end of the outgoing message, then, if there have been no previously-recorded incoming messages, the device records any incoming message from the calling party, but, if there have been previously recorded any such incoming messages, the drive mechanism is set into its fast-forward mode until the medium is advanced beyond the last of the previously-recorded incoming messages, following which the drive mechanism is set into its forward mode for recording the incoming message from the calling party. Then, following termination of the incoming call, the drive mechanism is set into its rewind mode for rewinding the medium back to the beginning of the recorded outgoing message, and, when the control signal detector determines that the control signal picked up by the transducer head corresponds to the portion of the medium immediately preceding the beginning of the recorded outgoing message, the drive mechanism is set into its stop mode, thereby conditioning the device to greet any subsequent calling party by playing back the recorded outgoing message.

These and other objects, features, and advantages of this invention will be appreciated from the ensuing description of preferred embodiments thereof, when read in conjunction with the accompanying drawings.

DETAILED DESCRIPTION OF THE PREFERRED EMBODIMENTS

Figures 1A, 1B, 1C, 1D, 1E, 1F:
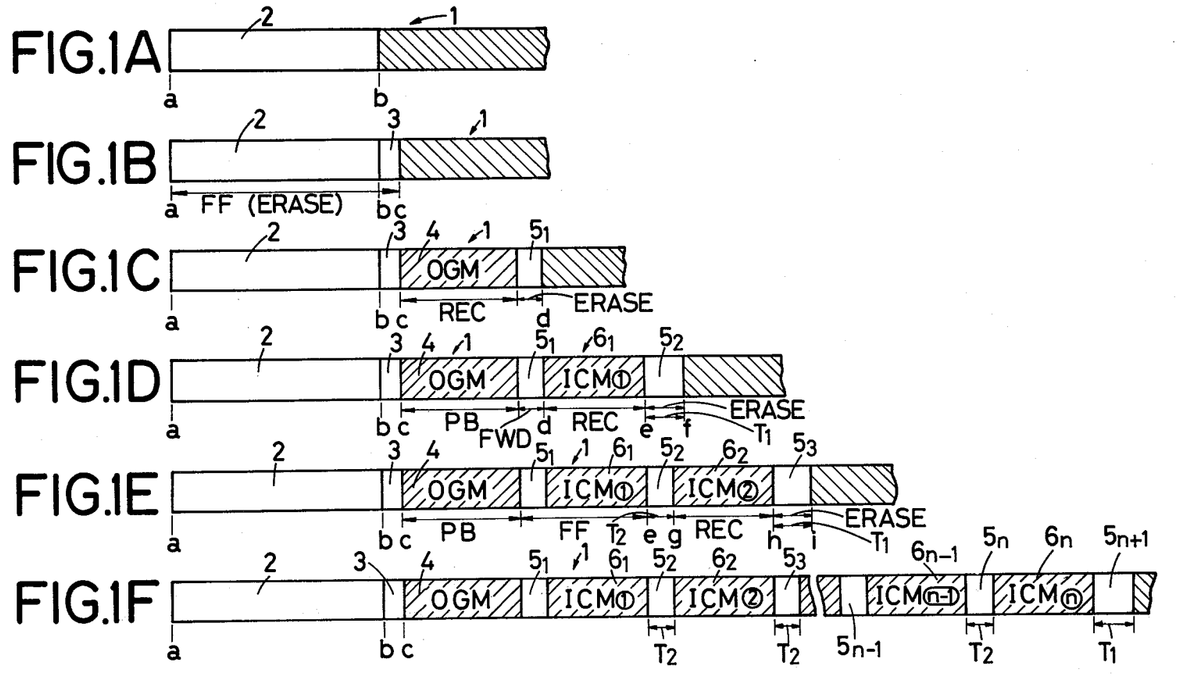
FIGS. 1A to 1F illustrate a magnetic tape as recorded by means of the telephone answering device of this invention.

The automatic telephone answering device, or telephone answering machine (TAM) embodying this invention automatically answers incoming calls and records any incoming messages in the manner generally illustrated in FIGS. 1A–1F of the accompanying drawings. The TAM employs a magnetic medium which can be formed as a tape cassette or microcassette, and which includes a magnetic tape 1 having a tape leader portion 2 extending from the head, or front end a to the junction b of the leader portion 2 with the remainder of the tape 1, as shown in FIG. 1A. When the tape 1 is loaded into the TAM, it is automatically rewound to the head a. Then, the tape 1 is fast-forwarded to the position b. In a usual standard cassette tape, the length of the leader portion 2, from position a to position b, corresponds to about sixty seconds of tape when the TAM is in a forward-running mode (i.e., at normal speed). Then, as illustrated in FIG. 1B, the tape is erased for a period of approximately 5 seconds to a position c to create a silent portion 3.

Then, as illustrated in FIG. 1C, an outgoing message, together with a control signal of, for example, 30 Hz, is recorded. The time allotted for the recording of the OGM 4 and the associated control signal is established, for example, at 30 seconds. Following the OGM 4, the magnetic tape 1 is erased for approximately three seconds to a position d. Thus, a silent signal portion $5_1$ is created in the magnetic tape 1.

After the OGM 4 has been recorded, the magnetic tape 1 is rewound to the position c. Then, the TAM stands by for an incoming call.

When the first incoming call is received, the OGM 4 is played, as shown in FIG. 1D. Then, after the silent portion $5_1$, an incoming message (ICM) $6_1$ from the first calling party is recorded from the position d to a subsequent position e. The control signal is recorded together with the message transmitted from the calling party to form the first ICM $6_1$.

Following the termination of the first call, the tape is erased from the position e to a subsequent position f to form a silent portion $5_2$ of length $T_1$ (preferably about 10 seconds). Thereafter, the tape is automatically rewound to the position c, and the TAM again stands by for the next incoming call.

As illustrated in FIG. 1E, when a second incoming call is received, the OGM 4 is played, and then the tape is automatically fast-forwarded to the position e. The tape is then erased for a relatively shorter period $T_2$ (approximately three seconds) at normal speed to a position g. Thereafter, the second incoming message $6_2$ from the second calling party is recorded on the tape from the position g to a subsequent position h, and the control signal is recorded simultaneously therewith. Following this, the tape is erased for a period of about 10 seconds at normal speed to a position i, thereby creating a silent portion $5_3$ of length $T_1$. Then, the tape 1 is rewound again to the position c.

As shown in FIG. 1F, whenever a third or subsequent incoming call is received, the OGM 4 is first played, and the tape is then advanced at fast-forward speed to skip beyond all of the previously recorded incoming messages $6_1$ to $6_{n-1}$. Then, the tape is erased for the period $T_2$ to form a silent portion $5_n$, and the incoming message $6_n$ is recorded, followed by a subsequent silent portion $5_{n+1}$ of length $T_1$.

As a result, when the OGM 4 and all of the incoming messages $6_1$ to $6_n$ are recorded on the tape 1, these messages are separated by silent portions $5_1$ to $5_n$ of nearly equal length $T_2$ (corresponding to about three seconds at normal speed), and the last recorded incoming message $6_n$ is followed by a silent portion $5_{n+1}$ of greater duration.

If the allotted time for recording each of the incoming messages $6_1$ to $6_n$ is thirty seconds, and approximately ten seconds of tape is erased following the recording operation, then approximately twenty incoming messages can be recorded on a single magnetic tape 1. In this example, the tape 1 has a recording time of ten minutes.

Figure 2:
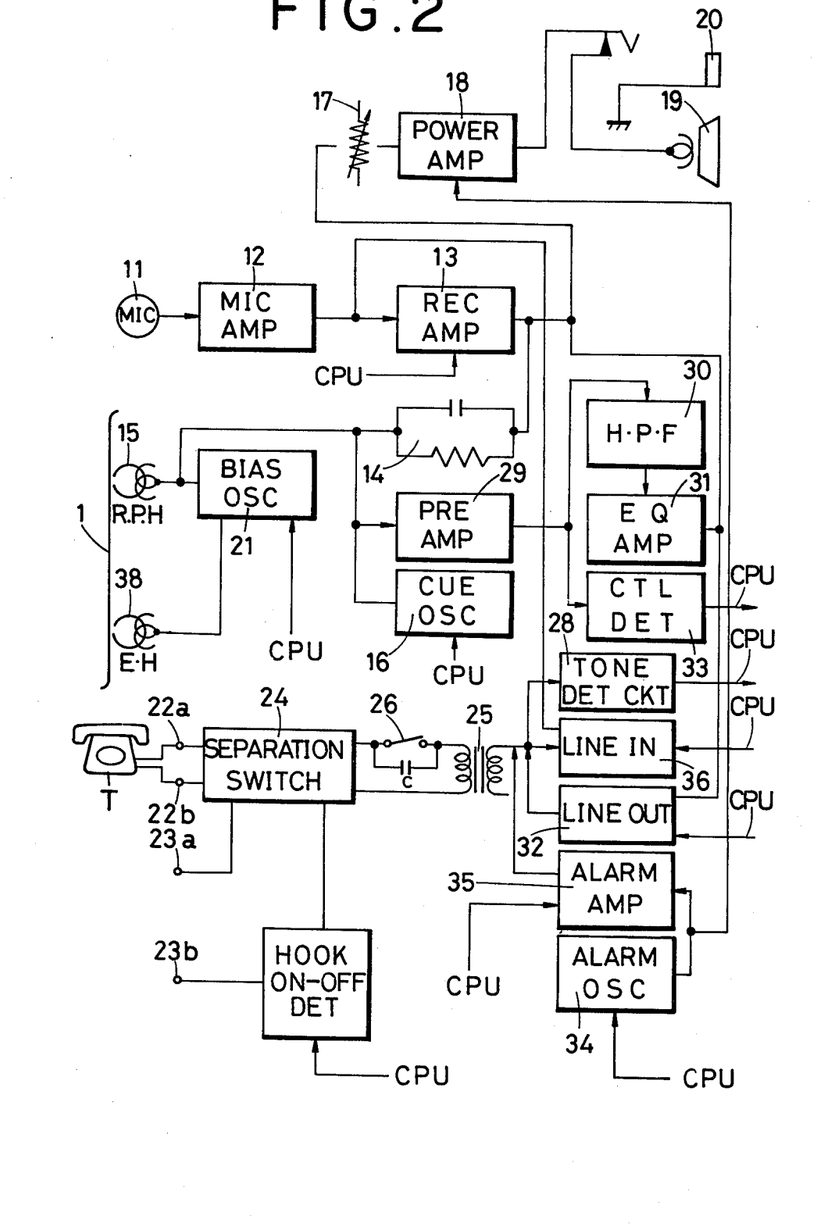
FIGS. 2 and 3 are circuit diagrams illustrating one embodiment of this invention.
Figure 3:
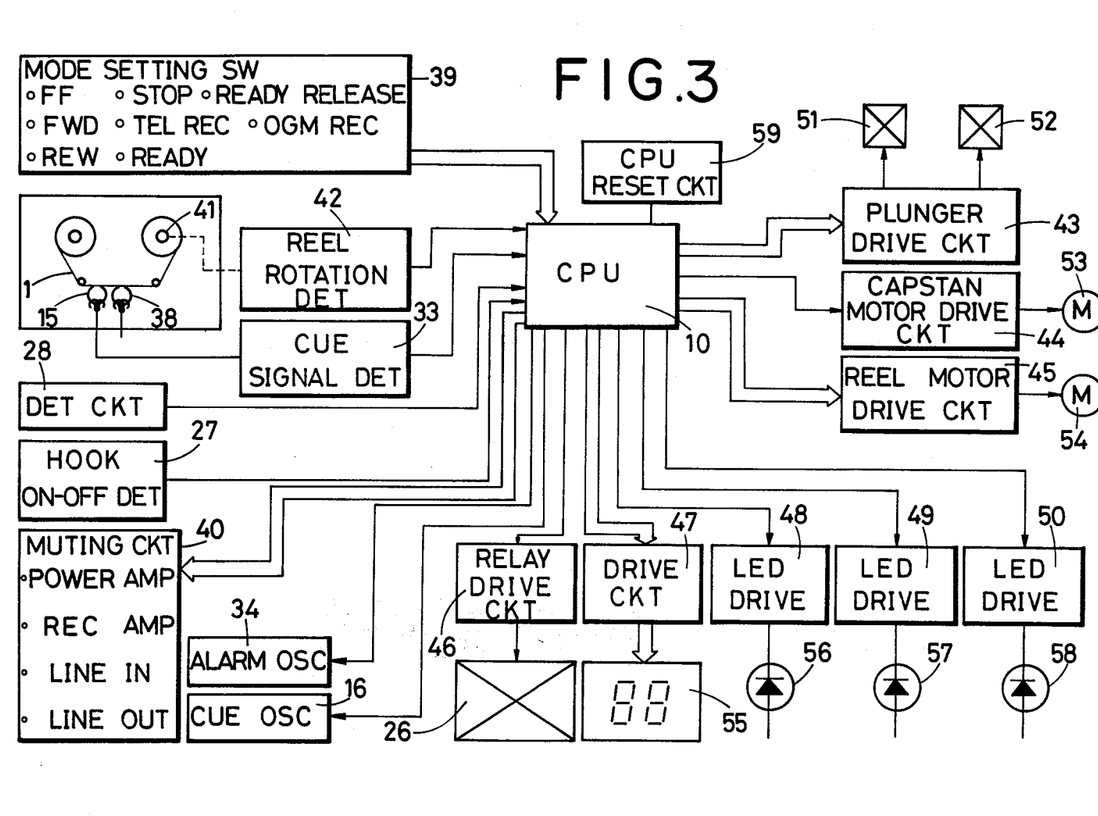

A telephone answering machine embodying this invention is illustrated in FIGS. 2 and 3. In this embodiment of the telephone answering machine, a microcomputer central processing unit (CPU) 10 is included. Preferably the CPU 10 includes an ROM or other storage unit which is pre-programmed with the necessary instructions for carrying out all of the above-described operations.

As shown in FIG. 2, the telephone answering machine of this embodiment also includes a built-in microphone 11 for use in preparing the recorded OGM 4. This microphone 11 is coupled through a microphone amplifier 12, a recording amplifier 13, and an equalizer 14 to a recording and playback head (RPH) 15. A cue signal oscillator 16 controlled by the CPU 10 provides to the head 15a control signal, which in this embodiment is a 30 Hz tone, which is below the audible range to which telephone communication equipment is responsive. The recording amplifier 13 is also coupled through a volume control variable resistor 17 to an input of a power amplifier 18, which is coupled to a loudspeaker 19 and an earphone jack 20. Here, the earphone jack 20 is coupled to cut the loudspeaker 19 out when an earphone plug is inserted therein, so that the telephone subscriber can audit any recorded calls in relative privacy.

A bias oscillator 21, controlled by the CPU 10, provides a bias current to the recording and playback head 15, and also provides an erasing current to an erase head 38.

Telephone instrument terminals 22a, 22b are provided to couple the TAM to a telephone instrument T, and telephone line terminals 23a, 23b are provided to couple the TAM to the tip side and ring side of the incoming telephone line.

The telephone line, the instrument T, and the TAM are coupled together by a separation switch 24. This switch 24 has a TEL-SIDE condition in which the telephone instrument T is operative but the TAM in inoperative, and a TAM-SIDE condition in which the telephone instrument and the telephone answering machine are connected in parallel, and both are operative. The separation switch is coupled through a capacitor C to permit ringing current to pass to a line transformer 25. A line answering relay 26 is included between the switch 24 and the line transformer 25 to connect the TAM to the telephone line in response to a detection of ringing current.

An on-hook/off-hook detector 27 is connected to the telephone line and detects whether the telephone instrument T is cradled or uncradled. The detector 27 provides an on-hook signal to the CPU 10 so long as the instrument T is cradled.

A ringing detector 28 coupled to the line transformer 25 senses ringing current, and signals to the CPU 10 when an incoming cell is present.

A preamplifier 29 has an input coupled to the recording and playback head 15 and has an output coupled through a high-pass filter 30 and an equalizing amplifier 31 to a line output device 32. The latter device 32, controlled by the CPU 10, connects the amplifier 31 with the line transformer 25 and thence with the telephone line. Thus, the CPU enables the recorded OGM 4 to be played to the calling party. The high-pass filter 30 has a cutoff frequency of, for example, 100 Hz, so that the control signal is blocked from the equalizing amplifier 31. The preamplifier 29 is also coupled in advance of the filter 30 to a control signal detector 33. The control signal detector 33 provides to the CPU 10 a "1" when the control signal in being picked up by the transducer head 15, but a "0" otherwise.

During the playing of the OGM 4, the control signal is blocked by the high-pass filter 30, but is furnished to the control signal detector 33. Thus, during the OGM 4, the detector 33 provides a "1" to the CPU 10, but during the silent portions $5_1$ to $5_n$ following the OGM 4 and following the incoming messages $6_1$ to $6_n$, the detector 33 provides a "0" to the CPU 10.

The telephone answering machine also includes an alarm oscillator 34 controlled by the CPU 10 to provide an audible alarm tone at the end of the OGM 4, for example, by providing a "beep" tone after a thirty second interval has elapsed. This "beep" tone is provided both to the power amplifier 18 and also to an alarm amplifier 35 controlled by the CPU 10, and from the amplifier 35 to the line transformer 25.

A line input circuit 36 is controlled by the CPU 10 to receive incoming messages from the calling parties and to furnish such messages to the input of the recording amplifier 13. Thus, in the intervals following the silent portions $5_1$ to $5_n$, the telephone line is coupled through the line input circuit 36 to the recording amplifier 13 and the equalizer 14, and thence to the recording and playback head 15 to record the calling party's incoming message $6_1$ to $6_n$.

Following the termination of the incoming message $6_1$ to $6_n$, the CPU 10 signals the bias oscillator 21 to provide an erasing current to the erasing head 38 to create the respective silent regions $5_2$ to $5_{n+1}$.

FIG. 3 shows a general arrangement of the CPU 10 and the other elements of the telephone answering machine.

A mode setting switch array 39 is coupled to the CPU 10 so that the subscriber can enter appropriate instructions for controlling the CPU 10. The mode setting switches contained in the array 39 are preferably non-locking push-button switches, here marked to indicate the selection of fast-forward, forward, rewind, stop, TEL-REC, ready, ready release, and OGM record. These switches are closed momentarily to apply a triggering signal to a self-holding operation controlling circuit (not shown) in the CPU 10.

A muting control signal 40 is being provided from the CPU 10 to the power amplifier 18, to the preamplifier 29, to the line input circuit 36, and/or to the line output circuit 32.

When OGM 4 is being recorded in the operation described below, a muting control signal is applied to the power amplifier 18 to prevent resonance from being established between the speaker 19 and the built-in microphone 11.

When the tape 1 is being erased to provide the silent portions 3 or $5_1$ to $5_{n+1}$, a muting control signal is provided to the recording preamplifier 29.

Except during periods when an ICM $6_1$ to $6_n$ is being recorded, a muting control signal is provided to the line input circuit 36. This prevents a ringing signal from being recorded together with the OGM 4, if an outside party should happen to call while the OGM 4 is being prepared.

Except during periods that the OGM 4 is being played, a muting control signal is furnished to the line output circuit 32. This feature prevents noise, such as motor noise or mechanical noises due to changing of speeds of the drive mechanism, from being placed on the phone line to a calling party.

A reel shaft 41 of the tape drive mechanism is connected to a reel-rotation detector 42. The cessation of movement of the shaft 41 is detected in the detector 42 to indicate that the tape has been rewound to the head position a. The CPU 10 applies control signals to a plunger drive circuit 43, to a capstan motor drive circuit 44, and to reel motor drive circuit 45. The CPU 10 also provides control signals to a relay drive circuit 46 for causing the relay 26 to close and also to a display drive circuit 47 and to LED drive circuits 48, 49, and 50.

The plunger drive circuit 43, in turn, controls a forward running plunger 51 and a fast-forward/rewind plunger 52. The plunger 51 is actuated when a forward mode (i.e., the record mode or the playback mode) is selected to displace a head plate (not shown) to an active position thereof wherein the heads 15 and 38 carried thereon engage the tape 1 and a capstan and an associated press roller also engage the tape 1. The plunger 52 is actuated whenever the rewind or the fast-forward mode is selected and displaces a brake plate (not shown) for conditioning a brake mechanism associated with the tape reel shaft 41 to brake the tape reel. This head plate and brake plate, with their associated mechanisms, are conventional, and drawings and description thereof are omitted to simplify the present disclosure.

The motor drive circuits 44 and 45 furnish drive currents to a capstan motor 53 and to a reel drive motor 54, respectively.

The drive circuit 47 drives a digital display 55 to indicate the number of incoming messages which have been recorded on the tape 1.

The LED drive circuits 48–50 respectively drive an operation display LED 56, a stand-by display LED 57, and an OGM stand-by display LED 58.

A CPU reset circuit 59 automatically resets the CPU 10 when power is first applied to the device, or upon ejection of the tape cassette from the device.

The operation of the TAM can be explained first by discussing the preparation of the recorded OGM 4.

The outgoing message 4 is set up on the tape 1 according to the following method, as illustrated in FIGS. 1B and 1C. First, when the tape 1 has been mounted on the TAM, the OGM recording button is actuated. Then, the tape is automatically rewound to the position a, and it is stopped. Subsequently, the tape 1 is advanced at fast-forward speed to the position b corresponding to approximately fifty-five seconds at the normal, or forward running speed. The tape 1 is then erased at normal speed to the position c, which is a few seconds beyond the end position b of the leader portion 2. Thereupon, the TAM stands by for the recording of the OGM 4, and the OGM stand-by display LED 58 is lit.

Now, the subscriber again actuates the OGM recording button to place the TAM into a recording mode. The subscriber then speaks into the microphone 11 to record an appropriate message indicating that the subscriber is not available to speak to the calling party and that the calling party should leave his or her message to be recorded. The 30 Hz control signal is simultaneously recorded onto the tape.

When the nominal time allotted for the OGM 4 elapses, the alarm oscillator 34 generates the "beep" tone, and the TAM is automatically shut off. Then, the silent portion $5_1$ is formed, and the tape 1 is stopped.

At this stage, the subscriber actuates a telephone-answering mode, or Ready button, and the tape 1 is automatically rewound to the position c. The OGM 4 is automatically played back so that the subscriber can monitor the quality of the OGM 4. Folllwing this, the tape 1 is automatically rewound to the position c, and the TAM stands by for any incoming calls. At this time, the incoming message stand-by display LED 57 is lit.

When an outside calling party dials up the subscriber, and the incoming telephone call arrives while the device is in its stand-by mode, a ringing signal, for example, a 15 Hz AC signal, is supplied to the telephone instrument T and is also applied through the line transformer 25 to the ringing detector 28. In this example, the ringing detector 28 is preset to supply a detecting signal after two rings, although any arbitrary number of rings could be selected. Then, in response to the detecting signal, the CPU 10 signals the relay drive circuit 46 which closes the relay 26 and thereby answers the incoming telephone call.

At that time, the OGM 4 and the associated control signal are reproduced from the tape 1. The reproduced signals picked up from the head 15 are supplied through the preamplifier 29 and the OGM 4 is furnished through the high pass filter 30, the equalizing amplifier 31, and the line output circuit 32 to the phone line. The control signal reproduced from the head 15 is applied to the control signal detector 33. The CPU 10 will then receive a "0" from the control signal detector 33 when the end of the OGM 4 is reached. At that time, the alarm oscillator 34 is caused to provide its "beep" tone through the alarm amplifier 35 and the transformer 25, so that the calling party will be alerted that he or she may prepare to speak.

After the "beep" tone has sounded for about three seconds, the calling party can state his or her message, and the incoming message will be recorded on the tape 1.

When a period of about thirty seconds has elapsed, the TAM is automatically shut off and the incoming call is terminated. Then the tape 1 is rewound to the position c.

The CPU 10 includes a storage area for storing a quantity corresponding to the number of incoming messages $6_1$ to $6_{n-1}$ which have been recorded on the tape 1. When the tape 1 is advanced at fast-forward speed to the starting point for the next incoming message $6_n$, the CPU 10 also counts the number n of the silent portions $5_1$ to $5_n$ which separate the regions $6_1$ to $6_n$ in which the control signal is recorded. When the stored quantity equals the counted number n, the CPU 10 then transmits a signal to the motor drive circuit 44 and 45 so that the TAM is set into its forward mode.

Thus, all of the circuits shown in FIG. 2 and FIG. 3 operate in accordance with the operation process previously described with reference to FIGS. 1A–1F.

As previously described, when the tape 1 is rewound to the position a at the head of the tape, the reel shaft rotation detector 42 detects that the reel shaft 41 has ceased to rotate. The CPU 10 then signals the motor drive circuits 44 and 45, and the latter cause the tape to advance to the position b and thence to the position c as shown in FIG. 1B.

Following the recording of the incoming message $6_n$, the CPU counts down from the quantity stored in the storage area for each occurrence of the silent portions $5_1$ to $5_n$, until the portion 3 is reached. Then the device is placed in condition to greet the next calling party with the OGM 4.

In this embodiment, the recording time for each incoming message is set to approximately thirty seconds. The result of this is that there is some waste of available time if the incoming message is relatively short. For example, if the incoming message ends in twenty seconds, the TAM continues to record when there is no further information, and the remaining period, i.e., approximately ten seconds, will be silent. Thus, in this embodiment, out of the total recording time of six-hundred seconds (twenty thirty-second calls) a significant portion of the space allocated for incoming messages $6_l$ to $6_n$ can be wasted.

Figure 4:
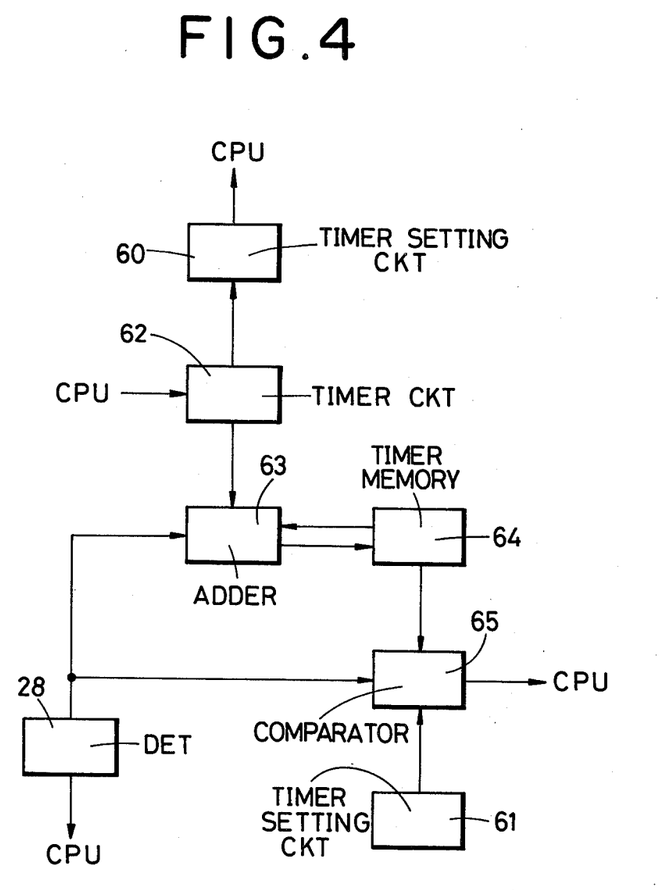
FIG. 4 is a circuit diagram illustrating a portion of a second embodiment of this invention.

In order to avoid this problem, a second embodiment of this invention, as illustrated in FIG. 4, in addition to the elements of FIGS. 2 and 3, includes means for releasing the telephone answering machine from the recording mode if the calling party hangs up prior to the lapse of thirty seconds. Thus, in this second embodiment, more than twenty incoming messages can be recorded, up to a maximum recording time of, for example, six-hundred seconds.

In this second embodiment, the detecting circuit 28 is arranged also to detect a call-inhibiting tone which is generated after the incoming calling party recradles his or her telephone instrument. Then, a signal indicating that this call-inhibiting tone is present is furnished from the ringing detector 28 to the CPU 10 to release the telephone answering machine from its recording mode, and to place it in the erasing mode to form the silent signal portion $5_n$. In this embodiment, a timer setting circuit 60 sets the maximum recording time of thirty seconds for each incoming message $6_I$ to $6_n$. A second timer setting circuit 61 sets the maximum total recording time, for all the incoming messages $6_I$ to $6_n$, to six-hundred seconds. A timer circuit 62 detects the recording time for each incoming message $6_I$ to $6_n$. Whenever the recording time for the incoming message $6_I$ to $6_n$ equals thirty seconds, the timer setting circuit 60 supplies an instruction signal to the CPU 10 to cause the latter to terminate the incoming call. At that time the telephone answering machine is automatically released from its recording mode.

If the incoming message terminates before the expiration of thirty seconds, the detector 28 detects the call-inhibiting tone and provides the CPU 10 with a signal to cause the latter to release the telephone answering machine from its recording mode. The recording time as detected by the timer circuit 62 is furnished to an adder circuit 63. The latter is coupled to the detector 28, and, as soon as the calling party hangs up, adds the recoring time from the timer 62 to the accumulated total time as stored in a timer memory 64, and then stores the sum thereof as a new cumulative total time in the timer memory 64.

A comparator 65 has inputs coupled to the timer memory 64, to the detector 28, and to the timer setting circuit 61. The comparator 65 provides a coincidence signal to the CPU 10 to cause the latter to release the telephone answering machine from the recording mode whenever the cumulative total time following the end of an incoming message coincides with six-hundred seconds, or is within a predetermined amount of time sufficiently close to six hundred seconds so that it would not be feasible to record another incoming call. In response to such coincidence signal, the telephone answering machine is released from its recording mode when the total elapsed time is equal to, or is nearly equal to six-hundred seconds.

The telephone answering machine of this invention is arranged so that a telephone-recording-only, or TEL-REC mode can be selected in which the outgoing message is not played to greet an incoming caller. In other words, in the TEL-REC mode, whenever an incoming call is received, the message from the calling party is recorded without first playing the OGM 4. In order to establish the TEL-REC mode, the TEL-REC button is actuated, and the telephone answering machine stands by for the next incoming call.

In this device, in order to avoid the inadvertent erasure of the OGM 4 when the TEL-REC mode is selected, the tape 1 is automatically advanced at the fast-forward speed for a predetermined time. If this predetermined time is selected to correspond to thirty seconds for normal speed, then the OGM 4 will be bypassed, and the tape will be advanced to the position d to stand by for the first incoming call. However, it is possible instead to cause the tape 1 to be advanced for any greater length of time. For example, if it is desired to bypass not only the OGM 4 but also any previously-recorded incoming messages $6_I$ to $6_n$, the tape 1 can be advanced for any distance up to that corresponding to six-hundred seconds of normal-speed play when the TEL-REC button is pushed.

The telephone answering device of this invention is also highly suited for operation by remote control.

It is well know that telephone answering machines can be constructed so that the subscriber, by calling his or her own number while away, and by producing a special tone from a tone generator, can cause his or her telephone answering machine to advance the tape at high speed, or to rewind the tape for seaching and playing of a desired one of the recorded incoming messages. However, because any typical incoming message is generally quite short, it is difficult to accurately search and find a desired one of a multiplicity of recorded incoming messages merely by use of the fast-forward and rewind operations. However, with the device of this invention, because the control signal is recorded together with the incoming messages $6_I$ to $6_n$, but is absent from the silent portions $5_I$ to $5_n$, the control signal can readily be used to search for the desired one of the recorded incoming messages. For example, when the tape is fast-forwarded or rewound by remote control, the control signal can be detected. Then, the tape can be stopped automatically upon detection of the next silent portion $5_I$ to $5_n$. Thereafter, the ensuing incoming message $6_I$ to $6_n$ is reproduced at normal speed. If that particular incoming message is not of interest, the tape can be advanced at fast-forward speed (or can be rewound) to the next (or next-previous) silent portion $5_I$ to $5_n$, and the next incoming message can be played. In this manner, the subscriber can, by remote control, listen to a few seconds of each message, and then skip immediately to the beginning of the next incoming message. In this manner, a desired one of the several recorded incoming messages $6_I$ to $6_n$ can be accurately and quickly searched by the subscriber, and such a search operation can be conducted with relatively little trouble.

Because the tape 1 is erased and recorded during operation to create the OGM 4, the ICMs $6_I$ to $6_n$, and the silent portions 3 and $5_I$ to $5_{n+1}$, any previously recorded signal on the tape 1 will be removed.

Thus, the tape 1 need not be unrecorded, and even a previously recorded unerased tape can be used. Also, the tape 1 can be used over and over without causing any special problems.

Although illustrative embodiments of this invention have been described in detail hereinabove with reference to the accompanying drawing figures, it is to be understood that this invention is not limited to those precise embodiments, and that various changes and modifications can be effected therein by one skilled in the art without departing from the scope and spirit of this invention as defined in the appended claims.

We claim:

1. A method of automatically answering phone calls on a phone line and recording messages from calling parties in sequence on a single magnetic tape with a magnetic tape device having a stop mode, a rewind mode, a forward mode, and a fast-forward mode comprising the steps of:

automatically coupling the device to the phone line upon detection of a ringing signal on the phone line;

setting the device into its forward mode and playing a prerecorded outgoing message recorded in a track on the magnetic tape;

after the playing of the outgoing message and if no previous incoming messages have been recorded, recording in said track any incoming message from the calling party simultaneously with a control signal followed by a silent portion that is free of said control signal, said control signal being separable from said incoming message on playback;

storing a quantity representing the number of incoming messages that have been previously recorded in said track;

after the playing of the outgoing message and if incoming messages have been previously recorded, setting said device into its fast-forward mode to drive said tape beyond the last such previously-recorded incoming message by detecting the presence of said recorded control signal and counting the number of spaces therein representing the silent portions between the recorded incoming messages, and then setting said device into its forward mode upon coincidence of the counted number of spaces and said stored quantity and recording the incoming message from the calling party simultaneously with said control signal followed by said silent portion that is free of said control signal, said control signal being separable from said incoming message on playback;

upon termination of the incoming message, setting the device into its rewind mode; and when said tape has been rewound to a point corresponding to the beginning of said recorded outgoing message, setting said device into its stop mode, thereby conditioning the device to greet any subsequent calling parties by playing back said recorded outgoing message.

2. A method of automatically answering phone calls on a phone line and recording messages from calling parties in sequence on a single magnetic tape with a magnetic tape device having a stop mode, a rewind mode, a forward mode, and a fast-forward mode, comprising the steps of:

automatically coupling the device to the phone line upon detection of a ringing signal on the phone line;

recording an outgoing message by:
setting said device into its rewind mode;
detecting the lead end of the magnetic tape;
automatically setting said device into one of its foward and fast-forward modes and advancing said tape beyond a leader portion;
creating a silent portion on one track free from any recorded signal; and recording said outgoing message in said track;

setting the device into its forward mode and playing said prerecorded outgoing message recorded in said track on the magnetic tape;

after the playing of the outgoing message and if no previous incoming message have been recorded, recording in said track any incoming message from the calling party simultaneously with a control signal followed by a silent portion that is free of said control signal, said control signal being separable from said incoming message on playback;

storing a quantity representing the number of incoming messages that have been previously recorded in said track;

after the playing of the outgoing message and if incoming messages have been recorded, setting said device into its fast-foward mode to drive said tape beyond the last such previously-recorded incoming message by detecting the presence of said recorded control signal and counting the number of spaces therein representing the silent portions between the recorded incoming messages, and then setting said device into its forward mode upon coincidence of the counted number of spaces and said stored quantity and recording the incoming message from the calling party simultaneously with said control signal followed by said silent portion that is free of said control signal, said control signal being separable from said incoming message on playback;

upon termination of the incoming message, setting the device into its rewind mode; and when said tape has been rewound to a point corresponding to the beginning of said recorded outgoing message, setting said device into its stop mode, thereby conditioning the device to greet any subsequent calling parties by playing back said recorded outgoing message.

3. A method of automatically answering phone calls according to claim 2, wherein said step of recording said outgoing message includes recording a user voice message, simultaneously recording a control signal together with the user voice message, said control signal being separable from the recorded user voice transmission upon playing of the recorded outgoing message, and creating a silent portion, following the recorded user voice transmission, that is free of said control signal.

4. An automatic telephone answering device in which an outgoing message recorded in a track in a magnetic medium is played back to greet calling parties and incoming messages from such calling parties are recorded in sequence in the same track in said medium, comprising:

means for detecting an incoming call and automatically connecting the device to a phone transmission line when an incoming call is detected;

transducer means for recording signals on said medium and picking up the recorded signals therefrom, said transducer means including erasing means for creating silent regions along said track which are free of recorded signals;

drive means for advancing said magnetic medium relative to said transducer means and capable of being set into a forward mode, a fast-forward mode, a rewind mode, and a stop mode;

control signal generating means for supplying a control signal to said transducer means;

detecting means for detecting the control signal picked up from the magnetic medium by said transducer means;

control circuit means, including memory means for storing a quantity representing the number of incoming messages that have been previously recorded in said track, coupled to said drive means, said control signal generating means, and said detecting means for controlling said control signal generating means so that said control signal is recorded on said magnetic medium simultaneously with said incoming message, said control circuit means for controlling said erasing means to create a silent region free of said control signal immediately following such incoming message, said control circuit means including means for counting the occurrences of said silent regions which follow the portions of said medium in which said control signal is recorded, and coincidence means connected to said means for counting and said drive means, and said control circuit means for controlling said drive means so that:

when said device is first connected to said phone transmission line, said drive means is set into its forward mode to play back said outgoing message;

when said detecting means determines that the control signal picked up by the transducer means has a characteristic indicative of the end of the outgoing message, then, if there have been no previously-recorded incoming messages, said device records any incoming message from the calling party, but if there have been previously recorded any such incoming messages, said drive means is set into its fast-forward mode until said medium is advanced beyond the last of the previously-recorded incoming messages, following which said drive means is set into its forward mode in response to a signal from said coincidence means generated when said quantity of occurrences of said silent regions read from said memory means equals the quantity of said occurrences counted by said means for counting for recording the incoming message from the calling party;

after termination of the incoming call, said drive means is set into its rewind mode for rewinding said medium back to the beginning of said recorded outgoing message; and when said detecting means determines that the control signal picked up by the transducer means corresponds to the portion of the medium in advance of the beginning of the recorded outgoing message, said drive means is set into its stop mode, thereby conditioning the device to greet any subsequent calling parties by playing back said recorded outgoing message.

5. An automatic telephone answering device according to claim 4, wherein said control signal is recorded as a low-frequency tone having a frequency below the audible range, and said device further comprises audio amplifying means for amplifying played back signals recorded on said medium, and low pass filter means coupled in advance of said audio amplifying means for blocking the reproduced control signal when said medium is played back in the forward mode of the device, but permitting the played-back control signal to pass to said detecting means.

6. An automatic telephone answering device according to claim 4, further comprising means for selecting a telephone-recording mode wherein said outgoing message is not played when said device is connected to said phone transmission line, said control circuit means being responsive to said means for selecting to cause said drive means to advance said medium beyond said outgoing message, and conditioning the device to stand by to record any incoming calls without first playing the outgoing message.

7. An automatic telephone answering device according to claim 6, wherein said control circuit means is responsive to said means for selecting to cause said drive means to advance said medium beyond all incoming messages recorded on said medium.

8. An automatic telephone answering device in which an outgoing message recorded in a track in a magnetic medium is played back to greet calling parties and incoming messages from such calling parties are recorded in sequence in the same track in said medium, comprising:

means for detecting an incoming call and automatically connecting the device to a phone transmission line when an incoming call is detected;

transducer means for recording signals on said medium and picking up the recorded signals therefrom;

drive means for advancing said magnetic medium relative to said transducer means and capable of being set into a forward mode, a fast-forward mode, a rewind mode, and a stop mode;

control signal generating means for supplying a control signal to said transducer means;

detecting means for detecting the control signal picked up from the magnetic medium by said transducer means;

control circuit means coupled to said drive means, said control signal generating means, and said detecting means for controlling said control signal generating means so that said control signal is provided to said transducer means so as to mark at least the beginning and end of said outgoing message and to mark at least the end of each said incoming message, and for controlling said drive means so that;

when said device is first connected to said phone transmission line, said drive means is set into its forward mode to play back said outgoing message;

when said detecting means determines that the control signal picked up by the transducer means has a characteristic indicative of the end of the outgoing message, then, if there have been no previously-recorded incoming messages, said device records any incoming message from the calling party, but if there have been previously recorded any such incoming messages, said drive means is set into its fast-forward mode until said medium is advanced beyond the last of the previously-recorded incoming messages, following which said drive means is set into its forward mode for recording the incoming message from the calling party;

after termination of the incoming call, said drive means is set into its rewind mode for rewinding said medium back to the beginning of said recorded outgoing message; and when said detecting means determines that the control signal picked up by the transducer means corresponds to the portion of the medium in advance of the beginning of the recorded outgoing message, said drive means is set into its stop mode, thereby conditioning the device to greet any subsequent calling parties by playing back said recorded outgoing message;

measuring means operative to measure incoming-message elapsed time beginning from the time that said transducer means commences recording each such incoming message on said magnetic medium;

storing means for storing a quantity representing total elapsed time for all incoming messages recorded on said medium;

adding means for adding the contents of said measuring means to the contents of said storing means and storing the resulting sum in said storing means; and comparing means for comparing the contents of said storing means with a predetermined quantity, and sending an inhibiting signal to said control circuit means whenever the contents of said storing means bear a preestablished relation to said predetermined quantity.

* * * * *